United States Patent [19]
Asai

[11] Patent Number: 6,097,916
[45] Date of Patent: Aug. 1, 2000

[54] IMAGE FORMATION APPARATUS AND IMAGE FORMATION METHOD

[75] Inventor: Hidehiko Asai, Toride, Japan

[73] Assignee: Canon Kabushiki Kaisha, Tokyo, Japan

[21] Appl. No.: 09/276,833

[22] Filed: Mar. 26, 1999

[30] Foreign Application Priority Data

Mar. 31, 1998 [JP] Japan .................................. 10-103950

[51] Int. Cl.[7] .................................................. G03G 15/00
[52] U.S. Cl. ........................... 399/182; 358/448; 399/407
[58] Field of Search ..................... 399/182, 187, 399/193, 82, 85, 407, 408; 358/448, 452, 401

[56] References Cited

U.S. PATENT DOCUMENTS 5,602,651   2/1997   Tabata et al. ............................ 358/448
5,717,843   2/1998   Tabata et al. ........................ 358/401 X
5,839,033   11/1998  Takahashi et al. ...................... 399/187

FOREIGN PATENT DOCUMENTS 63-141084   6/1988   Japan .

Primary Examiner—Robert Beatty
Assistant Examiner—Sophia S. Chen
Attorney, Agent, or Firm—Fitzpatrick, Cella, Harper & Scinto

[57] ABSTRACT

An image formation apparatus capable of performing image formation to enable an accurate postprocess to a sheet on which an image has been formed is provided. When the sheet discharged from a printer unit is subjected to a book binding process by a finisher, the apparatus performs an image formation process that a nonprint area including a processed portion to which a process concerning the book binding process is performed by the finisher and an effective print area are set in an image formation area on the sheet, and an original image read by a reader unit is formed in the effective print area.

46 Claims, 12 Drawing Sheets

IMAGE FORMATION APPARATUS AND IMAGE FORMATION METHOD

BACKGROUND OF THE INVENTION

1. Field of the Invention

The present invention relates to image formation apparatus and method for reading an image on an original, forming the read original image on a sheet of paper (referred as sheet hereinafter), and performing a postprocess to the sheet on which the image has been formed.

2. Related Background Art

Conventionally, there is known an image formation system in which an image formation apparatus for reading an image of an original and forming the read image on a sheet mounts with a postprocess device for performing a binding process, a folding process, a sorting process and the like to the sheets on which the images have been formed, whereby it is possible to reduce work such as sheet binding, sheet folding, sheet rearranging and the like.

As the postprocess device, there is a device capable of performing a series of processes to fold and bind the sheets and finally perform book binding. Such the postprocess device capable of performing a series of processes has a saddle-stitching mechanism which performs a process to fold the sheets in half and then performs a process to staple the folded sheets together. The saddle-stitching mechanism presses the predetermined portion of the sheet against a roller member to form the fold or crease on the sheet.

However, a friction coefficient between the roller member and the predetermined portion of the sheet is significantly different between a case where the roller member is in contact with the predetermined portion of the sheet on which the image has been formed and a case where the roller member is in contact with the predetermined portion of the sheet on which any image is not formed. For this reason, since the roller member may sometimes slip off the predetermined portion in either of these cases, the fold positions may be sometimes misregistered in either of these cases. As a result, since it is impossible to form the fold at the optimum position because of such misregistration of the sheets, it may be impossible to accurately perform the book binding process.

In order to avoid a situation wherein the fold positions are misregistered between the case where the image has been formed at the predetermined portion of the sheet and the case where any image is not formed at this position, it is considered reducing a variation of the friction coefficient between the roller member and the predetermined portion of the sheet as small as possible for each of these cases by changing materials of the roller member and the sheet. However, such a method cannot cope with variation of the friction coefficient due to variations of temperature and humidity of an atmosphere in which the sheets are placed. Thus, the fold positions of the sheets are similarly misregistered because of the variation of the friction coefficient between the roller member and the predetermined portion with which the roller member contacts.

SUMMARY OF THE INVENTION

An object of the present invention is to provide an image formation apparatus and an image formation method capable of solving such a problem as described above.

Another object of the present invention is to provide an image formation apparatus and an image formation method capable of preventing inconvenience caused in a postprocess for a sheet on which an image has been formed, and performing the accurate postprocess.

Other objects and features of the present invention will become apparent from the following detailed description and the attached drawings.

DETAILED DESCRIPTION OF PREFERRED EMBODIMENTS

Hereinafter, the embodiments of the present invention will be explained with reference to the accompanied drawings.

(First Embodiment)

Figure 1:
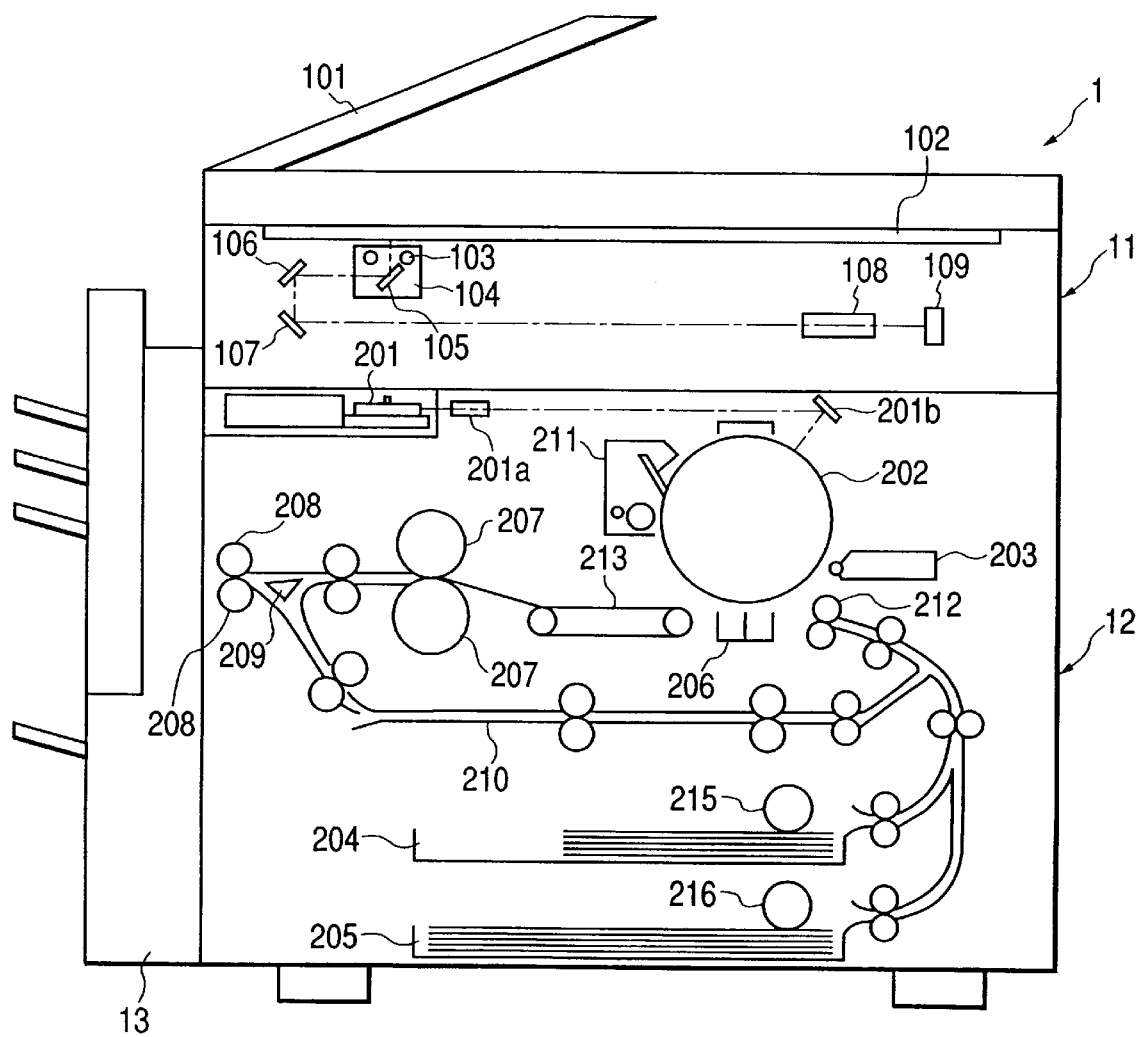
FIG. 1 is a view showing a structure of an image formation apparatus according to the embodiments of the present invention.
Figure 2:
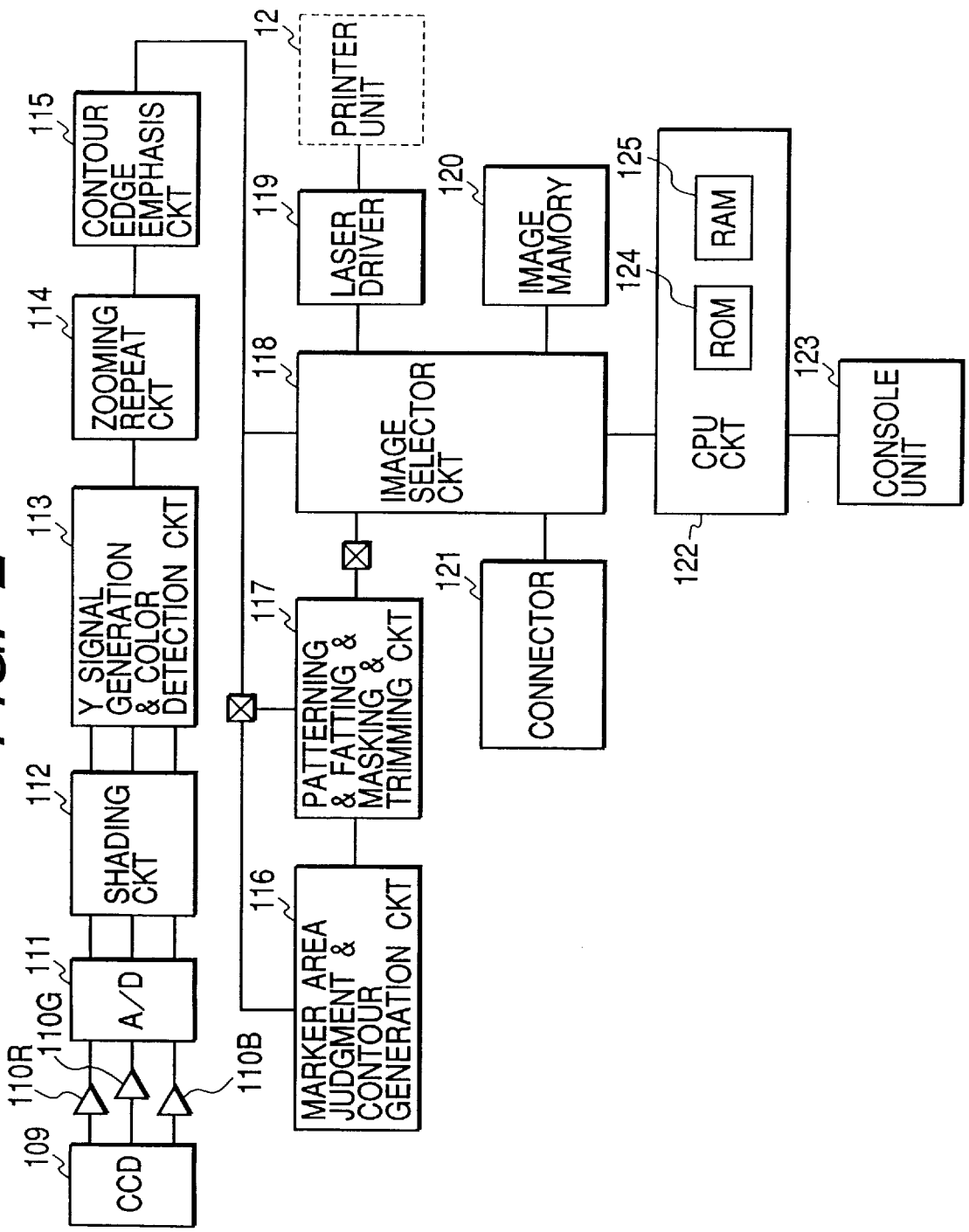
FIG. 2 is a block diagram showing a signal process structure of a reader unit in FIG. 1.
Figure 3:
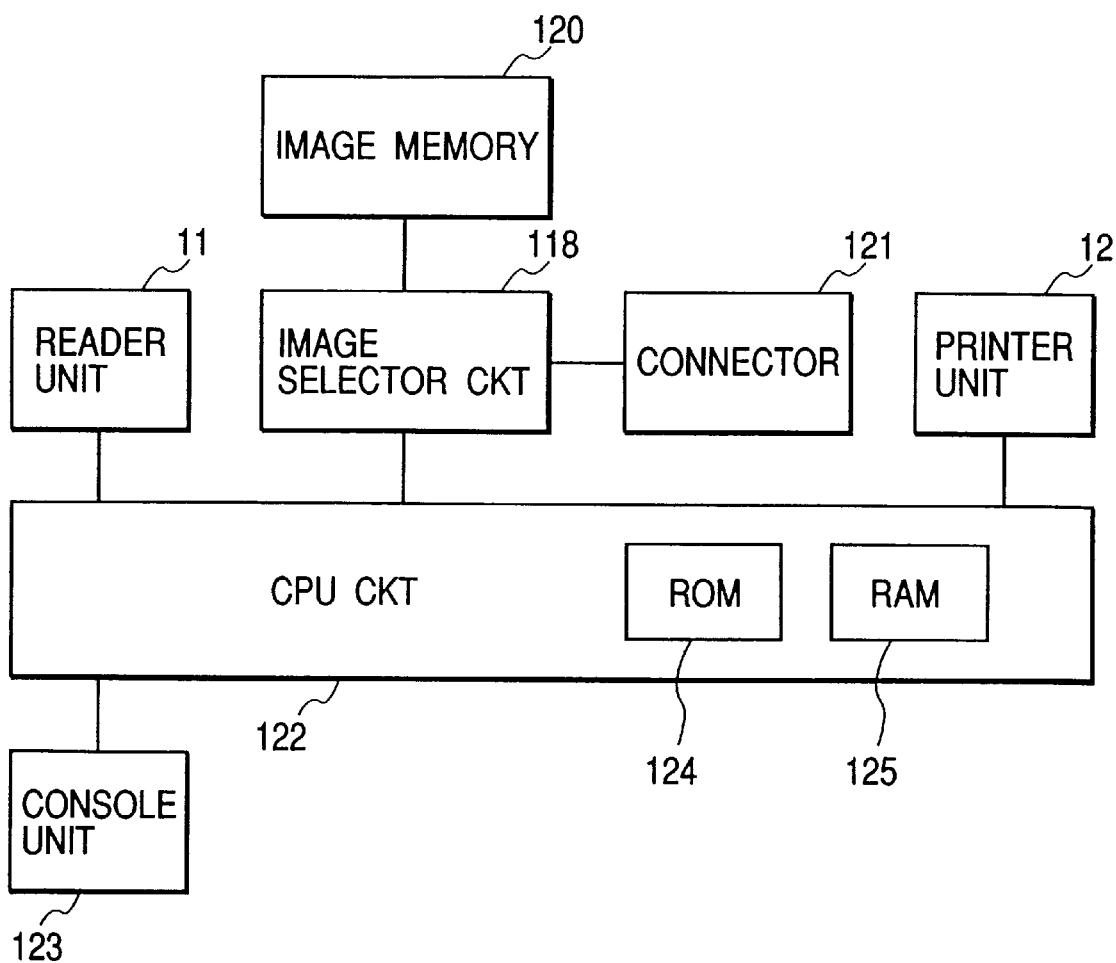
FIG. 3 is a block diagram showing a control structure of the image formation apparatus in FIG. 1.
Figure 4:
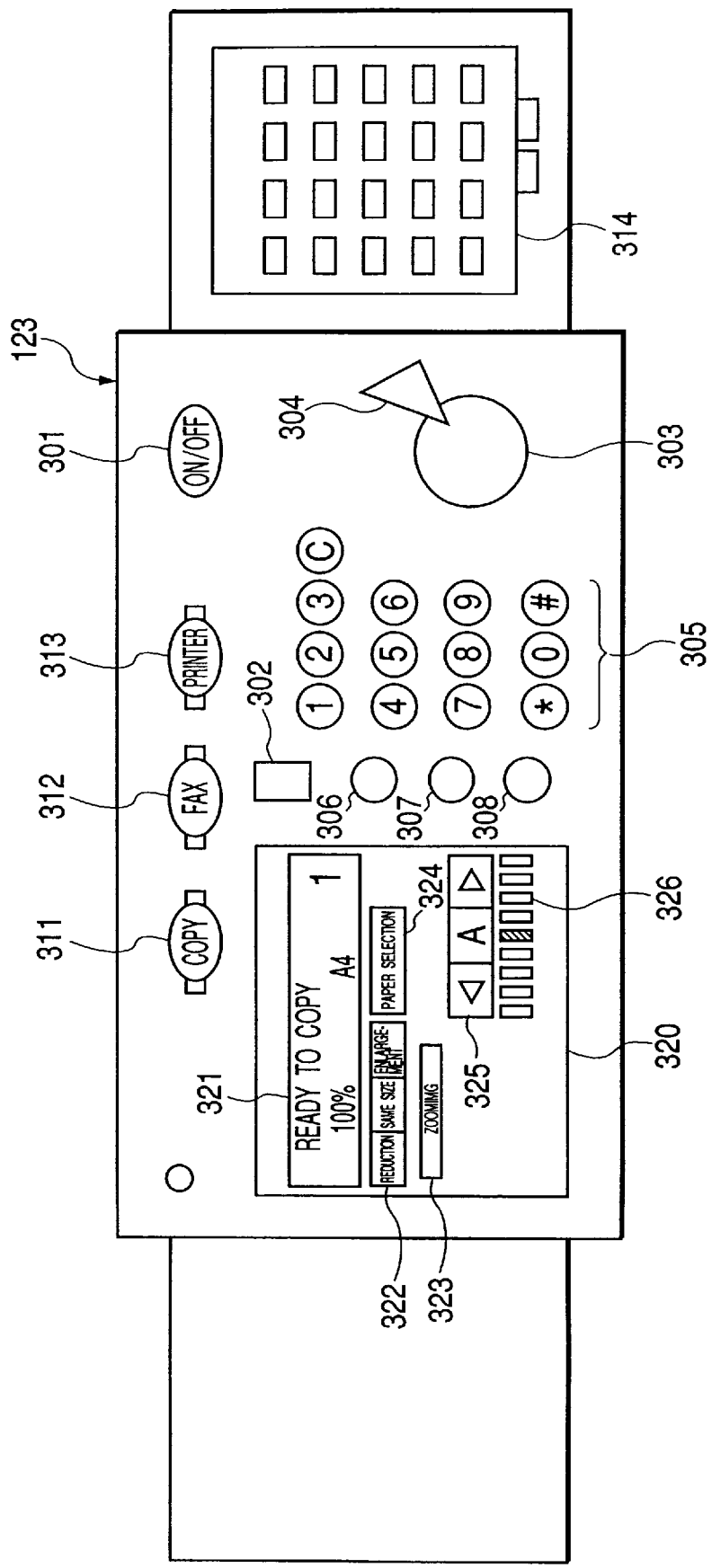
FIG. 4 is a key arrangement of a console unit provided with the image formation apparatus in FIG. 1.

FIG. 1 is a view showing a structure of an image formation apparatus according to the first embodiment of the present invention, FIG. 2 is a block diagram showing a signal process structure of a reader unit 11, FIG. 3 is a block diagram showing a control structure of the image formation apparatus in FIG. 1, and FIG. 4 is a key arrangement of a console unit provided with the image formation apparatus in FIG. 1. In the present embodiment, a multifunctional image formation apparatus having a copy function and a printer function will be explained by way of example.

As shown in FIG. 1, an image formation apparatus 1 is composed of the reader unit 11 and a printer unit 12. An automatic original feed device (referred as automatic document feeder: ADF hereinafter) 101 is mounted on the reader unit 11, whereby the original is fed and carried outwardly from its initial page one by one through a predetermined running reading position on a platen glass 102. When the original passes the running reading position, an image of the original is read by a scanner unit 104 at the corresponding position. Concretely, when the original passes the running reading position, the face of the original to be read is irradiated by light from a lamp 103, and reflected light from the original is guided to a lens 108 through mirrors 105, 106 and 107. Then, the light concentrated by the lens 108 is color-separated by R (red), G (green) and B (blue) color separation filters, and the obtained light forms an image on an image pickup face of an image sensor unit 109 composed of a CCD (charge-coupled device) and the like. The image sensor unit 109 is referred as the CCD 109 hereinafter.

By carrying the original to pass it through the running reading position, original reading scanning is performed in a main scan direction perpendicular to the original carrying direction and in a subscan direction being the original carrying direction. That is, when the original passes the running reading position, as the original image is read by the CCD 109 for each line in the main scan direction, the original is carried in the subscan direction. By doing so, the entire original image is read, the optically read image is converted into image data by the CCD 109, and the obtained image data is outputted. The image data outputted from the CCD 109 is subjected to a predetermined process, and then inputted to a printer unit 12 as a video signal. The structure as to the signal process in the reader unit 11 will be described later.

The printer unit 12 has an exposure control unit 201 to which the video signal is inputted from the CCD 109. The unit 201 modulates and outputs a laser beam on the basis of the inputted video signal, and the outputted laser beam is then scanned by a polygonal mirror and irradiated onto a photosensitive drum 202 through optical system members 201a and 201b. Thus, an electrostatic latent image corresponding to the laser beam is formed on the drum 202.

The electrostatic latent image on the drum 202 is visualized as a developing agent image by using a developing agent of each color supplied from a developing unit 203. Further, at a timing synchronous with an irradiation start of the laser beam, a sheet is fed from either a cassette 204 or a cassette 205 through a group of rollers including pickup rollers 215 and 216. The fed sheet is then carried between the drum 202 and a transfer unit 206 through a registration roller 212, whereby the developing agent image formed on the drum 202 is transferred onto the carried sheet. After the image transfer terminates, the residual developing agent on the drum 202 is eliminated by a cleaner 211.

The sheet to which the developing agent image has been transferred is carried to a fixing unit 207 through a carrying path 213. Since the fixing unit 207 is composed of a pair of rollers, the sheet is heat-pressed while it passes between the rollers, whereby the developing agent is fixed to the sheet. The sheet passed the fixing unit 207 is discharged to a finisher 13 through a pair of discharge rollers (referred as discharge roller hereinafter) 208. In a case where double-face recording is being set, it is controlled to guide the sheet into a paper refeed carrying path 210 by the operation of the discharge roller 208 and a changing operation of a flapper 209, and then to refeed the guided sheet between the drum 202 and the unit 206 at the above timing.

Since the finisher 13 has a saddle-stitching function capable of performing a stapling sort process and a book binding process to the sheet discharged from the printer unit 12. In any case, the structure and function of the finisher 13 will be described later.

Subsequently, a signal process in the reader unit 11 will be explained with reference to FIG. 2.

In the reader unit 11, as shown in FIG. 2, the light received by the CCD 109 is subjected to photoelectric conversion to generate R, G and B electrical signals. These signals are amplified by corresponding amplifiers 110R, 110G and 110B respectively up to predetermined levels, and then inputted to an A/D (analog-to-digital) converter 111. The A/D converter 111 converts the inputted R, G and B electrical signals into R, G and B digital signals respectively, and then outputs these digital signals. The outputted digital signals are then inputted to a shading circuit 112. The circuit 112 performs shading correction on the inputted R, G and B digital signals to correct uneven light distribution, uneven sensitivity of the CCD 109, and the like. The corrected R, G and B digital signals are inputted to a Y (yellow) signal generation and color detection circuit 113. The circuit 113 performs a calculation process on the R, G and B signals according to a following equation (1) to generate a Y signal (i.e., luminance signal).

$$Y = 0.3R + 0.6G + 0.1B \quad (1)$$

Furthermore, the Y signal generation and color detection circuit 113 separates seven colors from the R, G and B digital signals, and then generates a color detection signal for each color.

The signal outputted from the Y signal generation and color detection circuit 113 is then inputted to a zooming repeat circuit 114. Thus, the circuit 114 performs a zooming process such as image enlargement or image reduction in the main scan direction on the basis of the inputted signal. In this connection, it should be noted that the zooming in the subscan direction is performed by controlling the scanning speed of the scanner unit 104. In any case, the zooming repeat circuit 114 can output the identical image a plurality of times.

The signal outputted from the zooming repeat circuit 114 is then inputted to a contour edge emphasis circuit 115. Thus, the circuit 115 emphasizes a high-frequency component of the inputted signal to perform edge emphasis and also generates a contour signal. The signal outputted from the circuit 115 is then inputted to a marker area judgment and contour generation circuit 116 and a patterning, fattening, masking and trimming circuit 117.

The marker area judgment and contour generation circuit 116 extracts the portion on the original written with a marker of the designated color, on the basis of the inputted signal. Then, the circuit 116 generates the contour information of the extracted portion. The patterning, fattening, masking and trimming circuit 117 performs fattening, masking and trimming processes on the signal outputted from the contour edge emphasis circuit 115, on the basis of the contour information generated by the circuit 116. The circuit 117 also performs patterning on the basis of the color detection signal from the Y signal generation and color detection circuit 113.

The signal outputted from the patterning, fattening, masking and trimming circuit 117 is once stored as a video signal in an image memory 120 through an image selector circuit 118 according to necessity, or directly inputted to a laser driver 119 within the exposure control unit 201 of the printer unit 12. The driver 119 converts the inputted signal into a laser driving signal, whereby the laser beam is modulated and outputted in response to the laser driving signal. On the other hand, the video signal stored in the memory 120 is subjected to a rotation process, a synthesis process and the like, according to reading control performed by a CPU circuit 122 for the memory 120. A connector for connecting to an external apparatus such as a computer or the like is connected to the image selector circuit 118. In a case where a printer function is being set, the selector circuit 118 outputs the video signal inputted from the external apparatus to the laser driver 119 through the connector 121. Thus, the image formation apparatus according to the present embodiment functions as the printer of the connected external apparatus. Furthermore, a connector (not shown) for connecting to a modem used to realize a facsimile function is connected to the image selector circuit 118.

The CPU circuit 122 is composed of a CPU (not shown), a ROM (read-only memory) 124 which stores therein various control programs, and a RAM (random access memory) 125 which temporarily stores therein control data and is utilized in each control as a working area of the CPU. The CPU circuit 122 controls the operation of the reader unit 11, and also controls various operations of the printer unit 12 (including finisher 13) as described later.

Subsequently, the control of the CPU circuit 122 will be explained with reference to FIG. 3.

As shown in FIG. 3, the reader unit 11, the image selector circuit 118, the printer unit 12, the finisher 13 and a console unit 123 are connected to the CPU circuit 122, whereby the circuit 122 controls the operation of each unit. That is, the CPU circuit 122 outputs an instruction signal to the reader unit 11. On the basis of the instruction signal from the CPU circuit 122, the reader unit 11 performs driving control for the ADF 101, the scanner unit 104, the CCD 109 and the like, and also controls various signal process operations to generate the video signal from the electrical signal supplied from the CCD 109.

The CPU circuit 122 outputs a changeover signal according to the function being set, to the image selector circuit 118. Thus, the circuit 118 changes over the signal inputted to the printer unit 12 (i.e., laser driver 119 in FIG. 2) on the basis of the inputted changeover signal. Concretely, when the copy function is being set, the circuit 118 performs the changeover operation such that the signal inputted from the reader unit 11 (i.e., patterning, fattening, masking and trimming circuit 117 in FIG. 2) is outputted to the printer unit 12 (i.e., laser driver 119 in FIG. 2) or the image memory 120. Furthermore, the circuit 118 performs the changeover operation such that the signal read from the image memory 120 is outputted to the printer unit 12 (i.e., laser driver 119 in FIG. 2). On the other hand, when the printer function is being set, the circuit 118 performs the changeover operation such that the signal inputted from the external apparatus through the connector 121 is outputted to the printer unit 12 (i.e., laser driver 119 in FIG. 2) or the image memory 120. Furthermore, the circuit 118 performs the changeover operation such that the signal read from the image memory 120 is outputted to the printer unit 12 (i.e., laser driver 119 in FIG. 2).

Furthermore, the CPU circuit 122 outputs the instruction signal to the printer unit 12. Thus, on the basis of this instruction signal, the printer unit 12 controls the driving system for driving the exposure control unit 110, the photosensitive drum 102 and the like, and also controls the operations in the stapling sort process and the book binding process by the finisher 13.

Furthermore, the CPU circuit 122 outputs the instruction signal to the finisher 13. Thus, on the basis of this instruction signal, the finisher 13 performs the operation by using the saddle-stitching mechanism.

The console unit 123 has a plurality of keys for setting various functions concerning the image formation and a display section for displaying the information concerning various setting states. Thus, the unit 123 outputs key signals corresponding to various key operations to the CPU circuit 122, and displays the information corresponding to the signal from the circuit 122 on the display section.

Concretely, as shown in FIG. 4, various hardware keys such as a power switch 301, a reset key 302, a start key 303, a stop key 304, a ten-key group 305, a copy mode setting key 311, a facsimile mode setting key 312, a printer mode setting key 313, an interruption key 306, a stapling sort process setting key 307, a book binding process setting key 308 and the like are provided on the unit 123. A liquid crystal display unit 320 and a one-touch dial key 303 are also provided on the unit 123. The unit 320 has a display area 321 for displaying states of the apparatus, setting states of various modes, error messages and the like, and a display area for displaying various software keys. As the software keys, e.g., there are magnification change keys 322 (i.e., enlargement, same size and reduction keys) for setting a predetermined magnification, a zooming key 323 for setting an arbitrary magnification, a paper selection key 324 for selecting a paper sheet size, and density adjustment keys 325. A density level adjusted by the keys 325 is indicated by a density level indicator 326.

Subsequently, a method for using the image memory 120 will be explained with reference to FIGS. 5A, 5B, 5C, 5D, 5E, 5F, 5G, 5H, 5I and 5J. FIGS. 5A to 5J are views showing the storage area of the image memory provided in the image formation apparatus shown in FIG. 1.

Figure 5A:
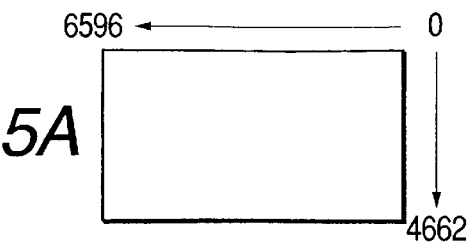
FIGS. 5A, 5B, 5C, 5D, 5E, 5F, 5G, 5H, 5I and 5J show structures of a storage area of an image memory provided with the image formation apparatus in FIG. 1.
Figure 5B:
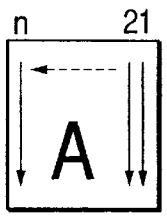
Figure 5C:
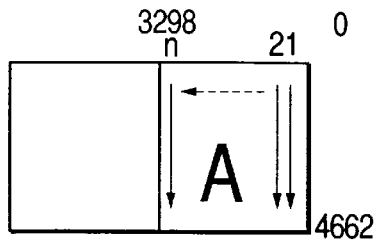

As shown in FIG. 5A, the image memory 120 contains a storage area having a capacity (longitudinally 4662 bits× laterally 6596 bits) capable of storing an A3-size image. Here, in a case where the original image of the size shown in FIG. 5B is read by the reader unit 11, as the original image is read in the main scan direction (i.e., solid-line arrow direction in FIG. 5B), this image is carried in the subscan direction (i.e., dotted-line arrow direction in FIG. 5B). In this case, when the first line is read, an X-direction counter (i.e., subscan direction counter) and a Y-direction counter (i.e., main scan direction counter) respectively start counting-up operations from a reference position (0, 0). The image data of the first line is written in due order at address positions of the memory 120 indicated by the count values of the counters. That is, the image data of the first line is written at the address positions from (0, 0) to (0, 4661). Then, if the image reading of the second line starts, the X-direction counter is increased by "1", and the image data obtained in the reading is written at the address positions from (1, 0) to (1, 4661). As above, the image reading and the image data writing are repeated line by line until the image data is written at the address position (3297, 4661).

Figure 5D:
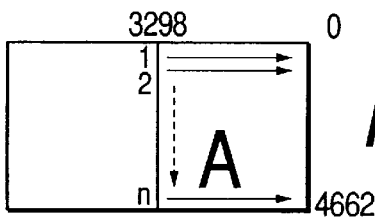
Figure 5E:
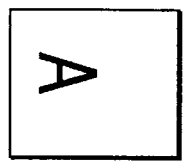

When the image data stored in the image memory 120 is read, as shown in FIG. 5D, the counting-down operation of the X-direction counter (subscan direction counter) and the counting-up operation of the Y-direction counter (main scan direction counter) start from the address position (3297, 0). That is, the image data is read at the address positions from (3297, 0) to (0, 0) on the basis of the count value of each counter. Then, the Y-direction counter is increased by "1", whereby the image data of next line is read. That is, the image data is read at the address positions from (3297, 1) to (0, 1). As above, the image data is read as the counting-down operation of the X-direction counter and the counting-up operation of the Y-direction counter are successively performed, whereby the image shown in FIG. 5E is obtained.

Figure 5F:
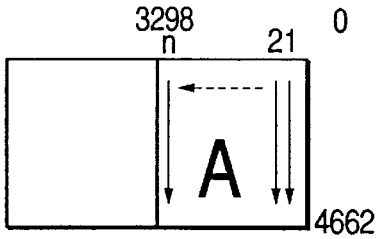
Figure 5G:
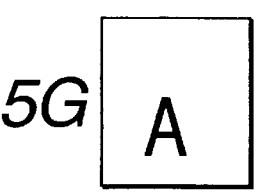
Figure 5H:
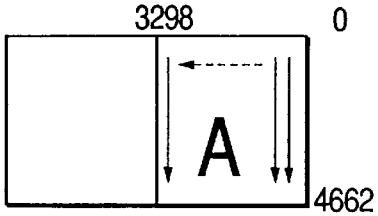
Figure 5I:
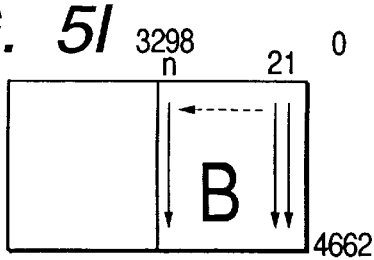
Figure 5J:
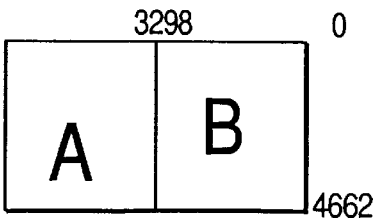

On the other hand, as shown in FIG. 5F, when the image data is read from the address position (0, 0) in the image memory 120, the counting-up operation of the X-direction counter (subscan direction counter) and the counting-up operation of the Y-direction counter (main scan direction counter) start. The image data is first read at the address positions from (0, 0) to (0, 4662) on the basis of the count values of the respective counters. Then, the Y-direction counter is increased by "1", whereby the image data of the next line is read. As above, the image data is read as the counting-up operation of the X-direction counter and the counting-up operation of the Y-direction counter are successively performed, whereby the image shown in FIG. 5G is obtained. Since the obtained image is the image rotated from the image of FIG. 5E by 90°, the image rotation process can be performed by controlling the image data reading position of the image memory 120.

When the plurality of images are synthesized and outputted, the image data (FIGS. 5H and 5I) respectively stored in the image memory 120 are read and written in a layout area in the memory 120, whereby it is possible to obtain in the layout area the image in which the respective images (FIGS. 5H and 5I) are synthesized.

As above, by controlling the image data reading from the image memory 120 with the CPU circuit 122, it is possible to perform the image rotation process and the image synthesis process.

Figure 6:
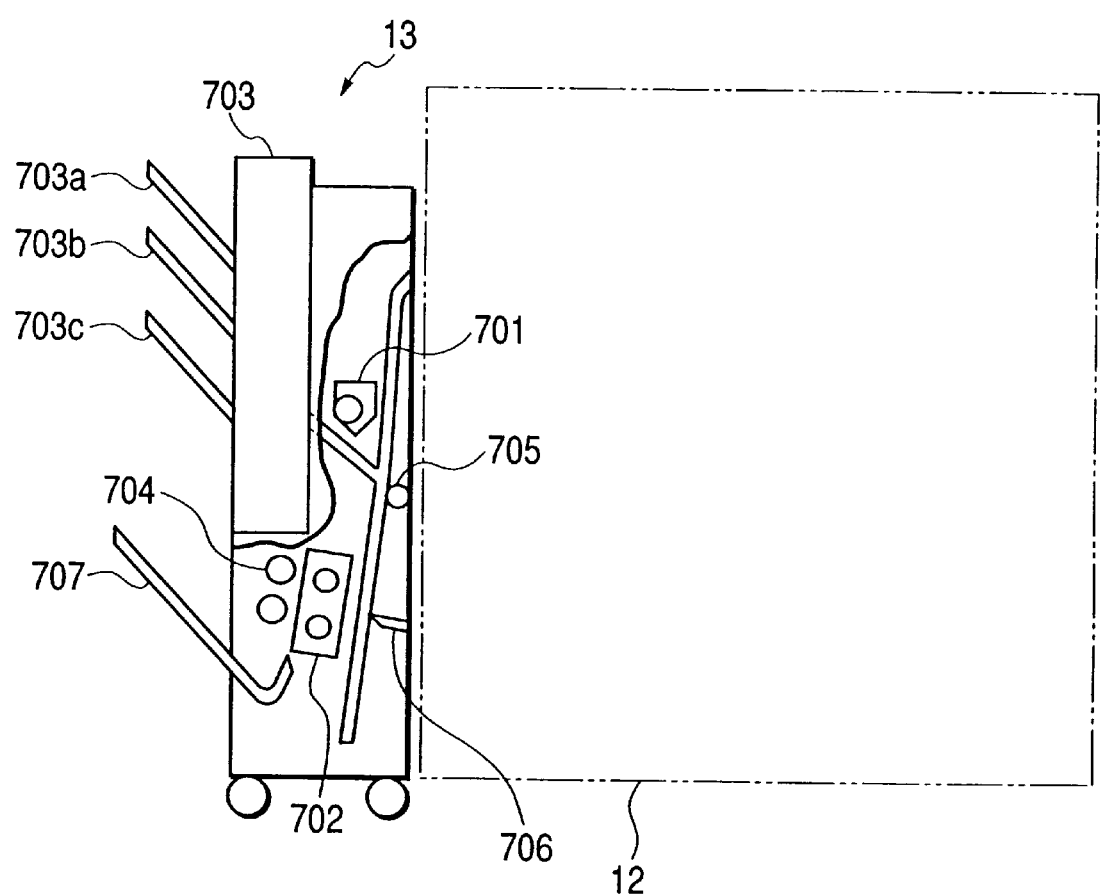
FIG. 6 is a schematic view showing a structure of a finisher 13 in FIG. 1.

Subsequently, structure and function of the finisher 13 shown in FIG. 1 will be explained with reference to FIGS. 6, 7A, 7B, 7C, 8A, 8B and 8C. FIG. 6 is a schematic view showing the structure of the finisher 13, FIGS. 7A to 7C are views showing an operation in the stapling sort process of the finisher 13, and FIGS. 8A to 8C are views showing an operation in the book binding process of the finisher 13.

As shown in FIG. 6, the finisher 13 is composed of a stapling unit 701 for stapling the sheets discharged from the printer unit 12; a sorting unit 703 for performing a sorting operation to discharge the carried sheets onto corresponding bins 703a, 703b and 703c in predetermined order; a pair of folding rollers 702 and a movable press member 706 together constituting a folding mechanism to fold the sheets discharged from the unit 12 in half; a carrying roller 704 for discharging the folded sheets discharged from the rollers 702 onto a paper discharge tray 707; and a carrying roller 705 for carrying the sheets discharged from the unit 12 to the sorting unit 703 through the stapling unit 701 or carrying the sheets toward the folding mechanism side.

Figure 7A:
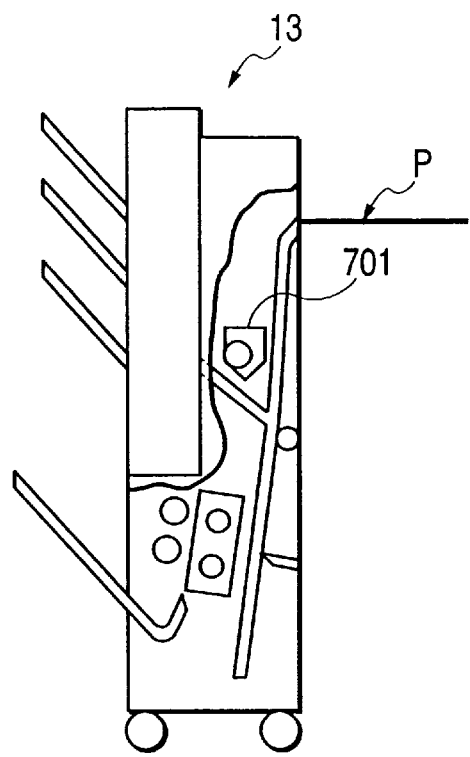
FIGS. 7A, 7B and 7C are views showing an operation in a stapling sort process of the finisher 13 in FIG. 1.
Figure 7B:
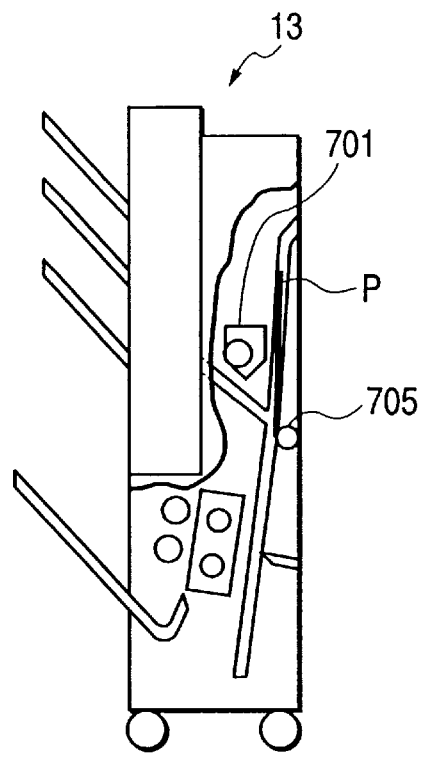
Figure 8A:
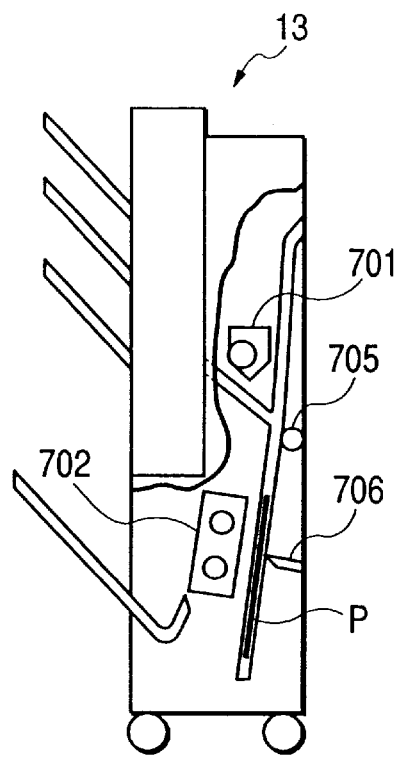
FIGS. 8A, 8B and 8C are views showing an operation in a book binding process of the finisher 13 in FIG. 1.
Figure 8B:
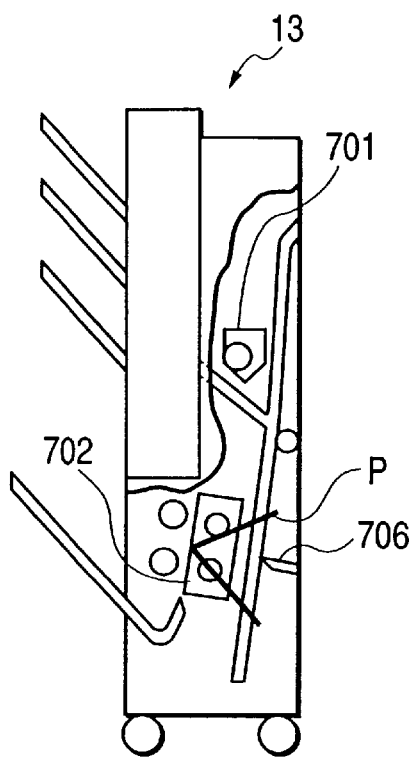
Figure 8C:
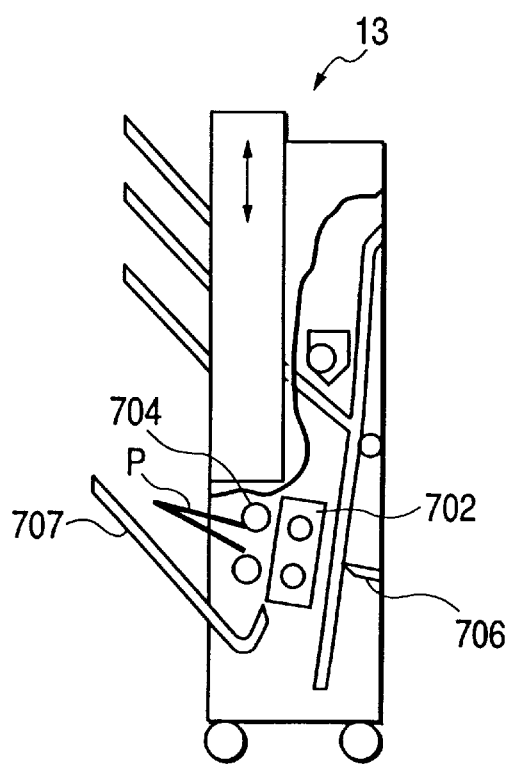

In the stapling sort process, as shown in FIG. 7A, a sheet P discharged from the printer unit 12 is first carried into the finisher 13. As shown in FIG. 7B, the sheet P is then carried inside until its predetermined portion reaches the predetermined position at which the portion is stapled by the stapling unit 701. If the predetermined portion of the sheet P reaches that position, the sheet P is held thereat. Then, the next sheet P is similarly carried and overlaid on the previous sheet P at this position. After then, if the predetermined number of sheets P are stacked and overlapped, the stapling unit 701 is moved to the set position to staple the overlapped sheets, thereby forming a sheaf of sheets P.

Figure 7C:
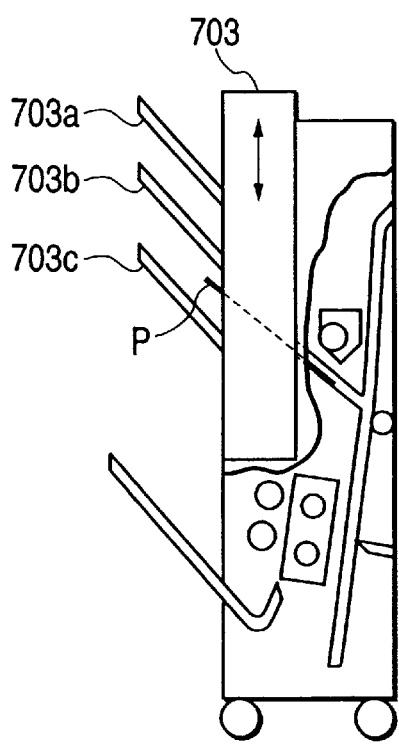

Subsequently, as shown in FIG. 7C, the stapled sheaf is carried to the sorting unit 703 by the carrying roller 705. Then, the sorting unit 703 drives the bins 703a to 703c such that the carried sheaves of sheets are respectively discharged onto the corresponding bins 703a to 703c.

In the book binding process, the sheet P discharged from the printer unit 12 is first carried into the finisher 13. Then, the sheet P is carried inside until its central portion reaches the position at which the portion is stapled by the stapling unit 701. If the central portion reaches that position, the sheet P is held thereat. Then, the next sheet P is similarly carried and overlaid on the previous sheet P at this position. After then, if the predetermined number of sheets P are stacked and overlapped, the stapling unit 701 is moved to the set position to staple the overlapped sheets, thereby forming a sheaf of sheets P.

Subsequently, as shown in FIG. 8A, the stapled sheaf of sheets is carried by the carrying roller 705 such that its central portion reaches the fold position. Then, as shown in FIG. 8B, the press member 706 moves toward the sheaf of sheets P. Thus, by such a pressing operation of the member 706, the predetermined portion of the sheaf is folded and simultaneously forced into the position between the folding rollers 702. Then, as shown in FIG. 8C, the rollers 702 carries the sheaf of sheets P, whereby the sheaf is folded in half and the folded sheaf is discharged therefrom. That is, the folded sheaf is discharged onto the paper discharge tray 707 by the carrying roller 704.

Here, it is possible to merely perform the sorting process without the stapling process by the stapling unit 701.

In the present embodiment, when the finisher 13 performs the book binding process to the sheets discharged from the printer unit 12, the apparatus performs an image formation process that a nonprint area (including a processed portion to which a process concerning the book binding process is performed by the finisher 13) and an effective print area are set in an image formation area on the sheet, and the original image read by the reader unit 11 is formed in the effective print area.

Figure 9:
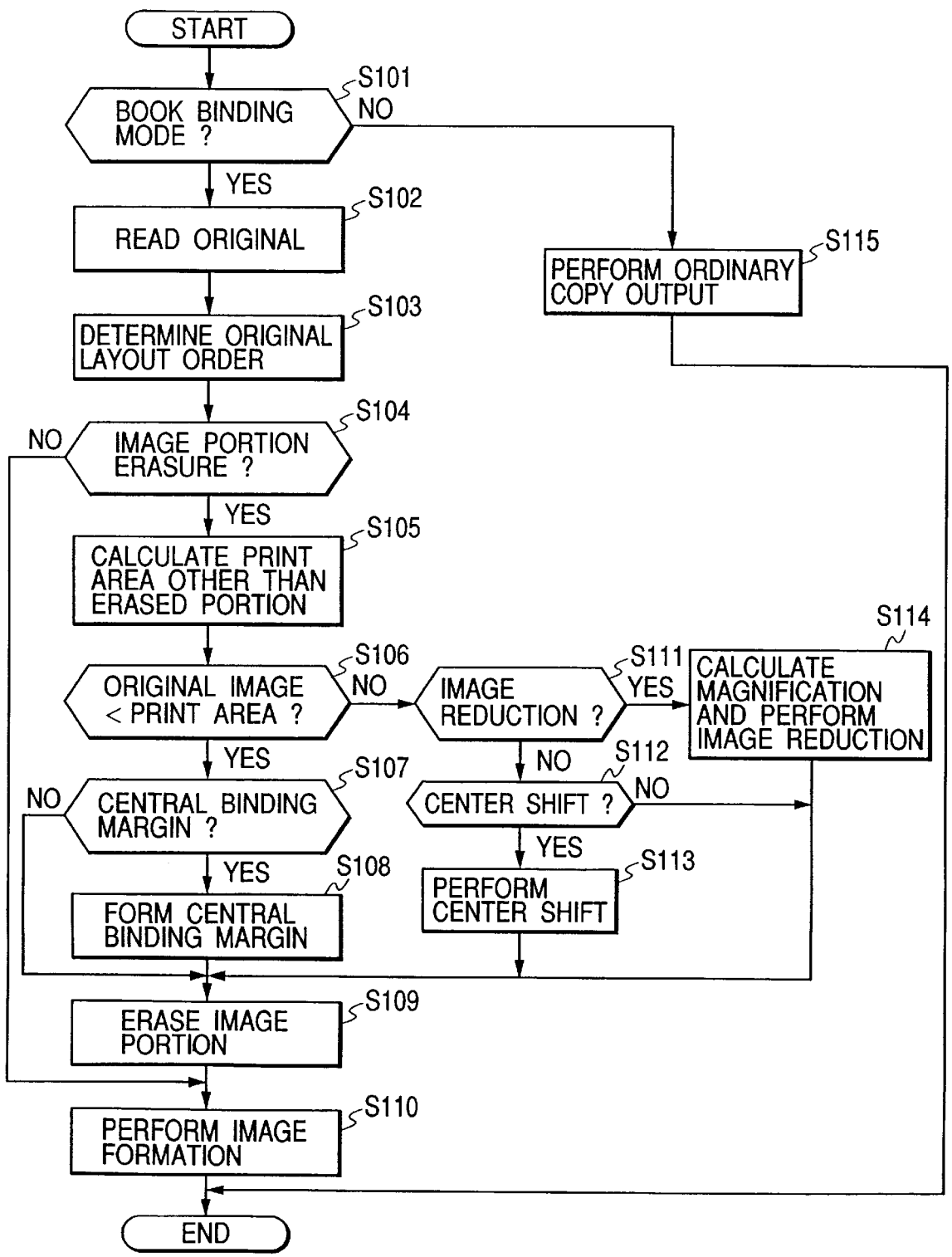
FIG. 9 is a flowchart showing an image formation process procedure in the book binding process of the image formation apparatus in FIG. 1.

Subsequently, a procedure in the above image formation process will be concretely explained with reference to FIG. 9. FIG. 9 is a flowchart showing the image formation process procedure in the book binding process of the image formation apparatus shown in FIG. 1. This process is performed by the CPU circuit 122 according to the programs stored in the ROM 124.

When the copy function is being set, it is first judged in a step S101 whether or not a book binding mode to perform the book binding process is also being set. If the book binding mode is not set, then the flow advances to a step S115 to control the ordinary copy output. In this case, the control is performed to feed the original from the ADF 101, read the image on the fed original, and output the read original image to the printer unit 12. Then, the unit 12 forms the received image on the sheet, and discharges the sheet onto the bin of the finisher 13. If the ordinary copy output in the step S115 terminates, the process terminates.

On the other hand, if it is judged in the step S101 that the book binding mode is being set, the flow advances to a step S102 to instruct the reader unit 11 to read the original. In this step, the image reading is performed for all the originals, and the obtained original images are all stored in the image memory 120. Then, the flow advances to a step S103 to determine the order (referred as original image layout order hereinafter) used when the read original images are arranged on the sheet.

Subsequently, the flow advances to a step S104 to judge whether or not image part erasure to erase the certain part in the image is to be performed based on the conditions (including original size, the number of originals, sheet size, the number of sheets, and the like) necessary for the book binding process. For example, when the B5-size sheet is used, since the book binding process is impossible in this size, it is determined in this step not to perform the image part erasure. As above, if the image part erasure is not performed, the flow advances to a step S110. In this step, the original images stored in the image memory 120 in the step S102 are appropriately synthesized according to the original image layout order determined in the step S103, the obtained synthesized image (referred as composite image hereinafter) is formed for each sheet, the formed image is outputted to the printer unit 12, and then the process terminates. The printer unit 12 forms the received composite image on the sheet, and sends the sheet to the finisher 13.

On the other hand, if it is judged in the step S104 to perform the image part erasure, the flow advances to a step S105 to calculate the print area to be obtained by erasing the nonprint area from the entire image formation area on the sheet. In this case, the image formation area on the sheet is the printable area which has been previously defined based on the sheet size by the apparatus. Furthermore, the nonprint area is the area in which the image formation is prohibited. This area includes at least the portion to which the postprocess such as the stapling process, the folding process or the like is performed when the sheet is folded in half and then subjected to the book binding process. Furthermore, this area has been previously set according to the original size, the sheet size and the like. It should be noted that the nonprint area is variable by the user's input from the console unit 123. The print area is the area in which the image formation is permitted, and is obtained from the image formation area of the sheet and the nonprint area. For example, when the images of the two A4-size originals (297 mm in main scan direction and 210 mm in subscan direction) are arranged on the A3-size sheet, the band-like area of 20 mm width (10 mm/10 mm) expanding toward the main scan direction at the central portion of the sheet is set as the nonprint area. In this case, the print area for each original image takes the size of 297 mm in the main scan direction and 200 mm in the subscan direction.

Then, the flow advances to a step S106 to judge whether or not the original image area formed on the sheet and the print area calculated in the step S105 satisfy the relation "original image area"<"print area". If it is judged that the relation "original image area"<"print area" is satisfied, the flow advances to a step S107 to judge whether or not it is set by the user's input from the console unit 123 to form a central binding margin If it is judged to form the margin, then the flow advances to a step S108 to actually form the central binding margin. In this step, the image on the sheet left side is shifted to the sheet left end, and the binding margin is formed at the right of the shifted image. Similarly, the image on the sheet right side is shifted to the sheet right end, and the binding margin is formed at the left of the shifted image. By doing so, it is possible to form the predetermined-width binding margin expanding in the main scan direction at the central portion of the sheet.

Subsequently, the flow advances to a step S109 to set the image part erasure range. In this step, since the central binding margin has been formed in the step S108, this binding margin is added to the set nonprint area, and such the combined area is set as the nonprint area. Thus, the image part erasure range is set based on the obtained nonprint area. On the other hand, if the central binding margin is not formed, the previously set nonprint area itself is set as the nonprint area, and the image part erasure range is set based on the obtained nonprint area.

In the subsequent step S110, the original images stored in the image memory 120 in the step S102 are synthesized according to the original image layout order determined in the step S103, the composite image is formed for each sheet, the formed image is outputted to the printer unit 12, and then the process terminates. In this step, the composite image from which the image part corresponding to the image part erasure range set in the step S109 has been erased is formed.

The printer unit 12 which received the composite image forms the received image on the sheet, and sends the sheet to the finisher 13. As above, the finisher 13 enters therein the sheets discharged from the printer unit 12 in due order, staples the central portion of the sheaf containing the predetermined number of sheets by using the stapling unit 701, and forces the central portion of the stapled sheaf into the position between the folding rollers 702 by using the press member 706. Thus, as the central portion of the sheaf of sheets is forcedly folded in half, this sheaf is passed between the rollers 702. In the case where the sheaf is folded in this manner, the rollers 702 are in contact with the central portion being the fold position of the sheaf. That is, since the rollers 702 are in contact with the nonprint area, the rollers 702 do not slip off even if a friction coefficient between the rollers 702 and the sheaf of sheets changes, whereby misregistration between the sheaf and the fold position does not occur. As a result, it is possible to form the fold at the optimum position and accurately perform the book binding process.

On the other hand, if it is judged in the step S107 not to form the central binding margin, the flow skips the step S108 and advances to the step S109 to set the image part erasure range. In this step, since the central binding margin is not formed, the previously set nonprint area itself is set as the nonprint area, and the image part erasure range is set based on the obtained nonprint area. In the subsequent step S110, the original images stored in the image memory 120 in the step S102 are synthesized according to the original image layout order determined in the step S103. Then, the composite image is formed for each sheet, the formed image is outputted to the printer unit 12, and the process terminates. In this case, since the composite original image can be held within each print area, any partial omission or lack does not occur in the image. Similarly, since the central portion of the sheet on which the composite images have been respectively formed is the nonprint area (including fold position), it is possible to form the fold at the optimum position and accurately perform the book binding process.

On the other hand, if it is judged in the step S106 that the relation "original image area"<"print area" is not satisfied, the flow advances to a step S111 to judge whether or not original reduction to reduce the original image size is being set by the user. If it is judged that the original reduction is not set, the flow advances to a step S112 to further judge whether or not center shift is being set by the user. If the center shift is not set, the flow advances to the step S109 to set the image part erasure range. In this step, the previously set nonprint area itself is set as the nonprint area, and the image part erasure range is set based on the obtained nonprint area. Then, in the subsequent step S110, the original images stored in the image memory 120 in the step S102 are synthesized according to the original image layout order determined in the step S103, the composite image is formed for each sheet, the formed image is outputted to the printer unit 12, and then the process terminates. As above, if the original image reduction and the center shift are not performed in the condition that the relation "original image area"<"print area" is not satisfied, the partial omission occurs in the image in the case where the nonprint area is set.

On the other hand, if it is judged in the step S112 that the center shift is being set, the flow advances to a step S113 to actually perform the center shift. It should be noted that the center shift is the process to shift the center of the original image in relation to the print area. For example, when the image part never intended to be erased is included in the nonprint area, the center shift is performed to shift such the image part from the nonprint area to the print area.

If the image reduction is being set in the step S111, the flow advances to a step S114 to calculate a reduction magnification by which the original image can be held within the print area. Then, the image reduction is actually performed based on the calculated magnification. In the above example that the images of the two A4-size originals are respectively arranged on the A3-size single sheet, since the magnification in the main scan direction is 100% (=297 mm/297 mm) and the magnification in the subscan direction is 95% (=200 mm/210 mm), the magnification 95% is set in both the main and subscan directions, and the image reduction is performed.

Subsequently, the flow advances to the step S109 to set the image part erasure range according to the previously set nonprint area. Then, in the subsequent step S110, the original images reduced in the step S114 are synthesized according to the original image layout order determined in the step S103, the composite image is formed for each sheet, the formed image is outputted to the printer unit 12, and the process terminates. As above, in the case where the original image is reduced in the condition that the relation "original image area"<"print area" is not satisfied, any omission does not occur in the image because the reduced original images can be completely held within the print area.

The concrete example of the above process will be explained with reference to FIGS. 10A, 10B, 10C, 11A, 11B, 11C, 11D, 11E, 12A, 12B, 12C, 12D and 12E. That is, FIGS. 10A to 12E are views showing the concrete example of the image formation in the book binding process of FIG. 9.

Figure 10B:
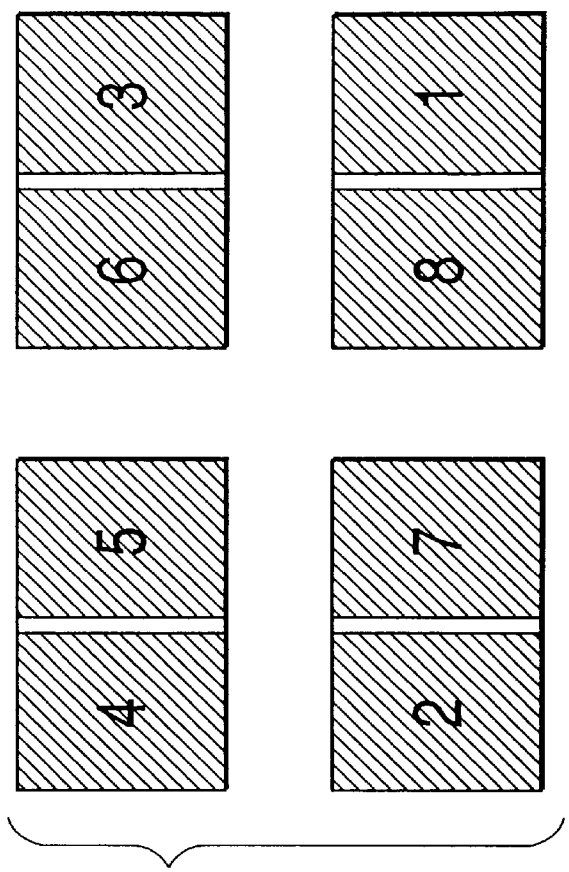
FIGS. 10A, 10B and 10C are views showing a concrete example of image formation in the book binding process in FIG. 9.
Figure 10C:
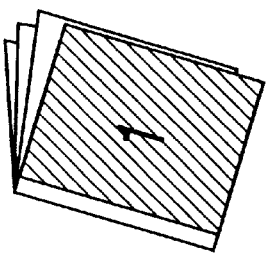
Figure 10A:
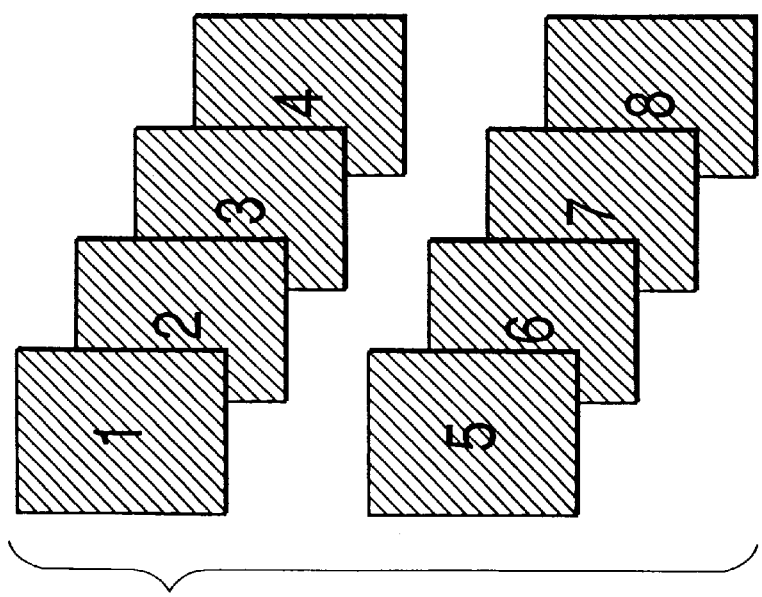
Figure 11E:
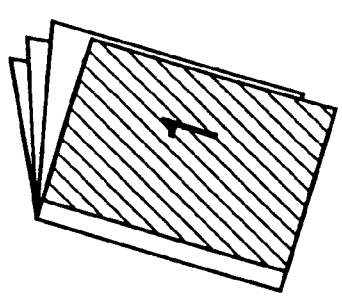
FIGS. 11A, 11B, 11C, 11D and 11E are views showing a concrete example of image formation in the book binding process in FIG. 9.
Figure 11C:
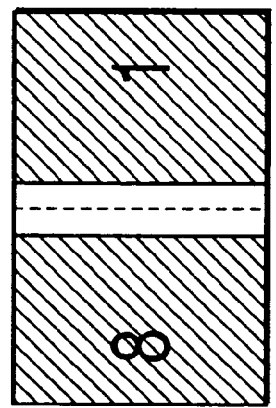
Figure 11D:
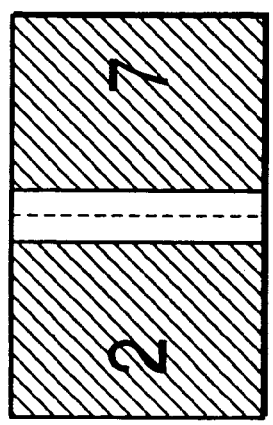
Figure 11A:
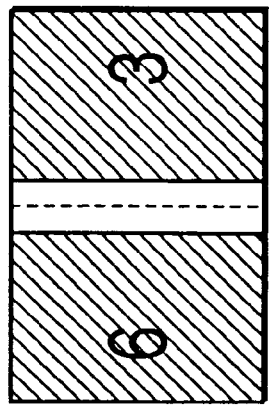
Figure 11B:
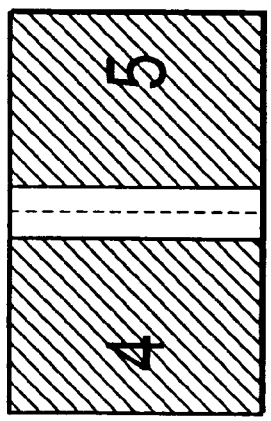

Initially, it will be explained with reference to FIGS. 10A to 10C the example of the book binding process that the eight originals which take the form of sheets are read, and the read original images are then formed on the front and back faces of the two sheets. In this example, as shown in FIG. 11A, the original images "1" to "8" are first read and stored in the image memory 120. Then, as shown in FIG. 10B, on condition that the print unit 12 operates in a double-face mode and discharges the sheet with its front face upward, the layout of the original images is determined. For the front face (on which image is formed through double-face mode paper refeed carrying path 210) of the first sheet, the original image "6" at the intermediate page (sixth page) is arranged on its left side, while the original image "3" at the intermediate page (third page) is arranged on its right side. For the back face (on which image is first formed in double-face mode) of the first sheet, the original image "4" at the intermediate page (fourth page) is arranged on its left side, while the original image "5" at the intermediate page (fifth page) is arranged on its right side. For the second sheet, the original image "8" at the final page (eighth page) is arranged on the left side of its front face, while the original image "1" at the initial page (first page) is arranged on the right side thereof. Furthermore, the original image "2" at the intermediate page (second page) is arranged on the left side of its back face, while the original image "7" at the intermediate page (seventh page) is arranged on the right side thereof.

Such a composite image based on the two original images arranged as above is formed in the print area on each of the front and back faces of the sheet. When the composite image is formed, the predetermined process such as the reduction process or the like is performed according to the relation between the original image size and the print area.

The processed composite image is sent to the printer unit 12 and formed on the sheet. Then, as shown in FIG. 10C, the respective sheets are bound by the finisher 13 to form the single sheaf. After then, the central portion of the formed sheaf is folded in the folding process, thereby performing the book binding.

Subsequently, the example concerning the formation of the central binding margin will be explained with reference to FIGS. 11A to 11E. Since the central binding margin is formed on condition that the relation "original image area"<"print area" is satisfied, it is possible to further enlarge the nonprint area by forming the central binding margin. However, in this case, the print area becomes small. For example, the central binding margin is formed in the case where the original image size is sufficiently smaller than the print area. Especially, this margin is formed in the case where the original image gives the sufficient space in the subscan direction of the print area on the sheet, and the original image is intended to be shifted to the corresponding sheet end. Concretely, in the case where the two B5-size original images are arranged on the A3-size sheet, such the central binding margin is formed.

As shown in FIGS. 11A to 11D, if the central binding margin is formed, the original images are shifted to and arranged at the corresponding sheet ends. It should be noted that the respective original images are arranged in the same manner as explained in FIGS. 10A to 10C. Then, the sheaf of sheets on which the original images are arranged as above is subjected to the book binding as shown in FIG. 11E.

Figure 12E:
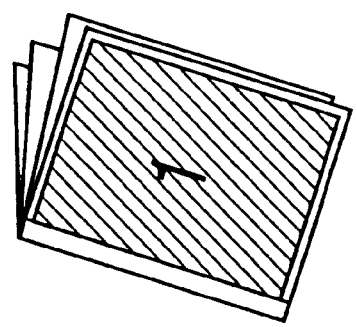
FIGS. 12A, 12B, 12C, 12D and 12E are views showing a concrete example of image formation in the book binding process in FIG. 9.
Figure 12C:
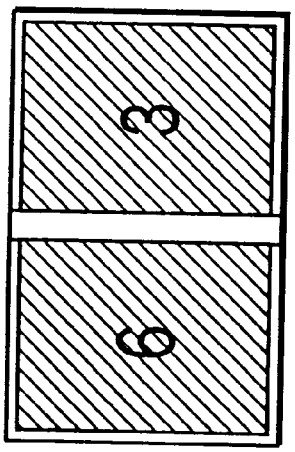
Figure 12D:
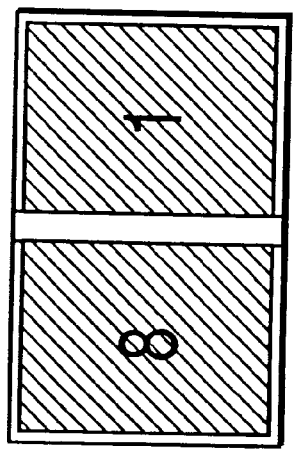
Figure 12A:
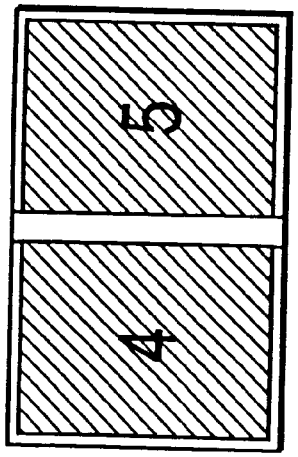
Figure 12B:
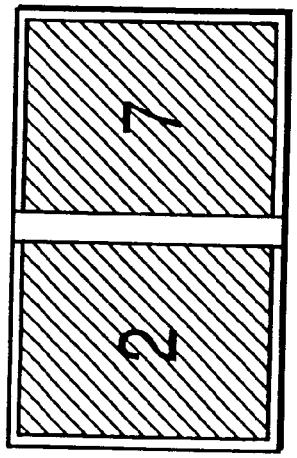

Subsequently, the example of the reduction process will be explained with reference to FIGS. 12A to 12E. The reduction process is performed on condition that the relation "original image area"<"print area" is not satisfied. By the reduction process, as shown in FIGS. 12A, 12B, 12C and 12D, the original images reduced in size are arranged in the print areas of the sheets. It should be noted that the respective original images are arranged in the same manner as explained in FIGS. 10A to 10C. Then, the sheaf of sheets on which the original images are arranged as above is subjected to the book binding as shown in FIG. 12E.

As above, in the present embodiment, when the sheets discharged from the printer unit 12 are subjected to the book binding process by the finisher 13, the nonprint area and the effective print area are set in the image formation area on the sheet. Here, the nonprint area is the area which includes the processed portion to which the process concerning the book binding is performed by the finisher 13. Then, the image formation process is performed to form the original image read by the reader unit 11 in the effective print area on the sheet. Therefore, when the sheaf of sheets is folded by the finisher 13, the fold position (i.e., central portion) of the sheaf being in contact with the rollers 702 can be managed as the nonprint area. For this reason, it is possible to minimize the change of the friction coefficient between the rollers 702 and the sheaf of sheets, thereby preventing that the rollers 702 slip off the sheet. As a result, the misregistration between the sheaf and the fold position does not occur, thereby realizing the accurate book binding.

(Second Embodiment)

In the step S104 of the flow charge shown in FIG. 9, it is judged whether or not the image part erasure is to be performed based on the condition necessary for the book binding process. However, in order to enable the user to set at the console unit 123 whether or not the image part erasure is to be performed, it is possible to provide a mode to partially erase the image (i.e., mode to prohibit image formation process in vicinity of fold on sheet to which folding process is performed) and a mode not to partially erase the image but output the image as it is (i.e., mode to permit image formation process in vicinity of fold on sheet to which folding process is performed).

If the CPU circuit 122 performs the process shown in the flow chart of FIG. 9, it is possible to prohibit the image formation process in the vicinity of the fold on the sheet to which the folding process is performed.

For this reason, as shown in FIGS. 8A to 8C, when the sheaf of sheets moved toward the folding rollers 702 by the press member 706 is nipped and folded by the rollers 702, it is possible to prevent a slip between the rollers 702 and the sheet (i.e., cover of sheaf of sheets subjected to book binding) being in contact with the rollers 702 and a slip between the sheets to be processed as one sheaf. Therefore, it is possible to accurately fold the sheaf of sheets at its predetermined portion (i.e., central portion being fold) moved by the press member 706, whereby it is possible to prevent that the folded sheet positioned inside the sheaf is erroneously removed.

Subsequently, it will be explained a case where the image formation apparatus further has a mode (e.g., book frame erasure mode) to perform an erasure process of the image formed at the central portion on the sheet, in addition to the above mode (referred to as a book binding mode hereinafter) to perform the book binding process.

The book frame erasure mode is the mode to erase, according to a two-page spread size of a book original, the images at the edge portions of the two-page spread book original read by the reader unit 11, the images positioned outside the edge portions and the image at the central portion. If the user sets the book frame erasure mode at the console unit 123, the two-page spread book original can be copied without unnecessary sheet frames and central shadow. The two-page spread size (e.g., A3 size) is selected by the user and the erasure width of the book central frame (e.g., 3 mm to 50 mm) is set in the book frame erasure mode. The frame erasure width (i.e., image erasure width) set by the user is stored in the image formation apparatus.

If the image formation apparatus has the book binding mode and the book frame erasure mode, i.e., if there are a plurality of modes to perform the erasure process of the image formed in the vicinity of the center of the sheet, the data concerning the image erasure width for erasing the image at the center of the sheet is previously stored in the memory for each mode. In this case, the memory for storing such the data has at least the area (referred as first area hereinafter) for storing the data concerning the image erasure width corresponding to the book binding mode and the area (referred as second area hereinafter) for storing the data concerning the image erasure width corresponding to the book frame erasure mode.

The image erasure process in the book frame erasure mode is the process aiming to erase the sheet frames and the central shadow ordinarily appearing when the two-page spread book original is copied. In this process, since the width of the central shadow is different according to the thickness of the book original to be copied, the image erasure width (e.g., 20 mm) is set by the user and the set data is previously stored in the second area of the memory.

On the other hand, the image erasure process in the book binding mode is the process aiming to prevent the slips occurring when the book binding process is performed (i.e., slip between rollers 702 and contacted sheet and slip between sheets to be processed as one sheaf). That is, the object of the erasure process in the book binding mode is different from that of the erasure process in the book frame erasure mode. In the book binding mode, in order to enable to obtaining the output infinitely close to the data desired by the user even if the image erasure process is performed, the minimum image erasure width (e.g., 10 mm) necessary to prevent the slip is set, and the data concerning this width is previously stored in the first area of the memory.

If either mode is selected by the user, the data concerning the image erasure width corresponding to the selected mode is read from the predetermined area in the memory, and the image erasure process is controlled by the CPU circuit 122 on the basis of the read data concerning the image erasure width.

For example, if the book frame erasure mode is selected by the user, the data concerning the image erasure width corresponding to the book frame erasure mode is read from the second area in the memory, and the image erasure process is performed based on the read data. In this case, e.g., the width 20 mm expanding in the main scan direction along the sheet central portion is set as the nonimage formation area, and the erasure process is performed on the image included in this area.

On the other hand, if the book binding mode is selected, the data concerning the image erasure width corresponding to the book binding mode is read from the first area (i.e., area different from area in which data concerning image erasure width corresponding to book frame erasure mode has been stored) in the memory, and the image erasure process is performed based on the read data concerning the image erasure width. In this case, e.g., the width 10 mm expanding in the main scan direction along the sheet central portion is set as the nonimage formation area, and the erasure process is performed in the image included in this area such that the image is not formed within the nonimage formation area.

What is claimed is:

1. An image formation apparatus comprising:

original image readout means for reading an original image;

image formation means for visualizing the original image read by said original image readout means and forming the visualized image on a transfer member; and postprocess means for performing a postprocess to the transfer member on which the original image has been formed, wherein, in a case where the postprocess is performed to the transfer member by said postprocess means, a nonimage formation area including a processed portion to which the postprocess is performed by said postprocess means and an effective image formation area are set in an image formation area on the transfer member, and the original image read by said original image readout means is formed in the effective image formation area on the transfer member, wherein, in the case where the original image read by said original image readout means is formed on the transfer member, an image part of the original image positioned in the nonimage formation area is deleted, and the original image from which the image part has been deleted is formed in the effective image formation area on the transfer member.

2. An apparatus according to claim 1, wherein it is judged according to a postprocess execution condition of said postprocess means whether or not the nonimage formation area can be set on the transfer member, and it is determined according to the judged result whether or not the nonimage formation area is to be set on the transfer member.

3. An apparatus according to claim 2, further comprising stapler means for performing a stapling process on the transfer member, and wherein it is judged whether or not the nonimage formation area is to be set on the transfer member, according as a size of the transfer member is a stapling-processable size by said stapler means.

4. An apparatus according to claim 2, wherein the judgment is performed by said postprocess means.

5. An apparatus according to claim 1, wherein the nonimage formation area is changeable.

6. An apparatus according to claim 5, wherein the nonimage formation area is changed based on a size of the original and a size of the transfer member.

7. An apparatus according to claim 5, wherein the nonimage formation area is changed based on an instruction from a user.

8. An apparatus according to claim 1, further comprising image movement means capable of moving the original image to an arbitrary position, and wherein the original image is moved on the set effective image formation area of the transfer member, by said image movement means.

9. An apparatus according to claim 8, further comprising movement prohibition setting means for performing setting to prohibit the movement of the original image by said image movement means.

10. An apparatus according to claim 1, further comprising image reduction means for reducing the original image read by said original image readout means, and wherein the original image is reduced by said image reduction means such that the original image can be held within the set effective image formation area of the transfer member.

11. An image formation method used for an image formation apparatus comprising an original image readout means for reading an original image, an image formation means for visualizing the original image read by the original image readout means and forming the visualized image on a transfer member, and a postprocess means for performing a postprocess to the transfer member on which the original image has been formed, said method comprising the steps of:

in a case where the postprocess is performed to the transfer member by the postprocess means, setting a nonimage formation area including a processed portion to which the postprocess is performed by the postprocess means and an effective image on an image formation area on the transfer member;

forming the original image read by the original image readout means, in the effective image formation area on the transfer member;

in the case where the original image read by the original image readout means is formed on the transfer member, deleting an image part of the original image positioned in the nonimage formation area; and forming the original image from which the image part has been deleted, in the effective image formation area on the transfer member.

12. A method according to claim 1, further comprising:

judging whether or not the nonimage formation area can be set on the transfer member, according to a postprocess execution condition of the postprocess means; and determining whether or not the nonimage formation area is to be set on the transfer member, according to the judged result.

13. A method according to claim 12, wherein the postprocess means comprises a stapler means for performing a stapling process to the transfer member, and said method further comprises the step of judging whether or not the nonimage formation area is to be set on the transfer member, according as a size of the transfer member is a stapling-processable size by the stapler means or not.

14. A method according to claim 12, wherein the judgment is performed by the postprocess means.

15. A method according to claim 11, wherein the nonimage formation area is changeable.

16. A method according to claim 15, wherein the nonimage formation area is changed based on a size of the original and a size of the transfer member.

17. A method according to claim 15, wherein the nonimage formation area is changed based on an instruction from a user.

18. A method according to claim 11, wherein an image movement means capable of moving the original image to an arbitrary position is provided, and said method further comprises the step of moving the original image on the set effective image formation area of the transfer member, by using the image movement means.

19. A method according to claim 18, further comprising the step of setting the image formation apparatus to prohibit the movement of at least two or more original images by the image movement means.

20. A method according to claim 11, wherein an image reduction means for reducing the original image read by the original image readout means is provided, and said method further comprises the step of reducing the original image by using the image reduction means such that the original image can be held within the set effective image formation area of the transfer member.

21. An image formation apparatus comprising:

image formation means for forming an image on a sheet;

folding means for performing a folding process to the sheet on which the image has been formed by said image formation means; and prohibition means for prohibiting an image formation process to a vicinity of a fold on the sheet to which the folding process is performed by said folding means.

22. An apparatus according to claim 21, wherein said apparatus further comprises:

a control means for selecting a first mode and a second mode of operation, wherein the first mode prohibits the image formation process to the vicinity of the fold on the sheet to which the folding process is performed by said folding means, and wherein the second mode permits the image formation process to the vicinity of the fold on the sheet to which the folding process is performed by said folding means.

23. An apparatus according to claim 21, wherein said prohibition means performs a deletion process of the image formed in the vicinity of the fold on the sheet to which the folding process is performed by said folding means.

24. An apparatus according to claim 21, wherein said apparatus further comprises:

a control means for selecting a first mode and a second mode of operation, wherein the first mode performs a deletion process of the image formed in the vicinity of the fold on the sheet to which the folding process is performed by said folding means, and wherein the second mode different from the first mode, performs a deletion process of the image formed in the vicinity of the center of the sheet;

storage means for storing data concerning a deletion width of the image for each mode; and selection means for selecting either one of the first and second modes, wherein in a case where either one of the first and second modes is selected by said selection means, the deletion process of the image is performed based on the stored data corresponding to the selected mode.

25. An image formation apparatus capable of being connected to a sheet process device for performing a folding process to a sheet, said apparatus comprising:

image formation means for forming an image on the sheet; and prohibition means for prohibiting an image formation process to a vicinity of a fold on the sheet to which the folding process is performed by said sheet process device.

26. An apparatus according to claim 25, wherein said apparatus further comprises:

a control means for selecting a first mode and a second mode of operation, wherein the first mode prohibits the image formation process to the vicinity of the fold on the sheet to which the folding process is performed by said sheet process device, and the second mode permits the image formation process to the vicinity of the fold on the sheet to which the folding process is performed by said sheet process device.

27. An apparatus according to claim 25, wherein said prohibition means performs a deletion process of the image formed in the vicinity of the fold on the sheet to which the folding process is performed by said sheet process device.

28. An apparatus according to claim 25, wherein said apparatus further comprises:

a control means for selecting a first mode and second mode operation, wherein the first mode performs a deletion process of the image formed in the vicinity of the fold on the sheet to which the folding process is performed by said sheet process device, and the second mode different from the first mode, performs a deletion process of the image formed in the vicinity of the center of the sheet;

storage means for storing data concerning a deletion width of the image for each mode; and selection means for selecting either one of the first and second modes, wherein, in a case where either one of the first and second modes is selected by said selection means, the deletion process of the image is performed based on the stored data corresponding to the selected mode.

29. An image formation method for an image formation apparatus capable of being connected to a sheet process device for performing a sheet folding process, said method comprising:

an image formation step of forming an image on the sheet; and a prohibition step of prohibiting an image formation process in a vicinity of a fold on the sheet to which the sheet folding process is performed by the sheet process device.

30. A method according to claim 29, further comprising:

a selection step of selecting one of a first mode and a second mode, wherein the first mode prohibits the image formation process in the vicinity of the fold on the sheet to which the sheet folding process is performed by the sheet process device, and the second mode permits the image formation process in the vicinity of the fold on the sheet to which the folding process is performed by the sheet process device.

31. A method according to claim 29, wherein said prohibition step performs a deletion process of the image formed in the vicinity of the fold on the sheet to which the folding process is performed by the sheet process device.

32. A method according to claim 29, further comprising:

a selection step of selecting one of a first mode and a second mode, wherein the first mode performs a deletion process of the image formed in the vicinity of the fold on the sheet to which the sheet folding process is performed by the sheet process device, and the second mode performs a deletion process of the image formed in the vicinity of a center of the sheet; and a storage step of storing data concerning a deletion width of the image for each mode, wherein, in said prohibition step, the deletion process of the image is performed based on the stored data corresponding to the selected mode.

33. A computer-readable storage medium which stores a program having computer readable program code units for causing an image formation apparatus capable of being connected to a sheet process device for performing a sheet folding process, said storage medium comprising:

an image formation program code unit for forming an image on the sheet; and a prohibition program code unit of prohibiting an image formation process to a vicinity of a fold on the sheet to which the folding process device.

34. A storage medium according to claim 33, further comprising:

a selection program code unit selecting a first mode or a second mode, wherein the first mode prohibits the image formation process to the vicinity of the fold on the sheet to which the folding process is performed by the sheet process device, and wherein the second mode permits the image formation process to the vicinity of the fold on the sheet to which the folding process is performed by the sheet process device.

35. A storage medium according to claim 33, wherein said prohibition program code unit performs a deletion process of the image formed in the vicinity of the fold on the sheet to which the folding process is performed by the sheet process device.

36. A storage medium according to claim 33, further comprising:

a selection program code unit for selecting either one of a first mode and a second mode, wherein the first mode performs a deletion process of the image formed in the vicinity of the fold on the sheet to which the folding process is performed by the sheet process device, and wherein the second mode performs a deletion process of the image formed in the vicinity of the center of the sheet; and a storage program code unit for storing data concerning a deletion width of the image for each mode, wherein, in said prohibition program code unit, the deletion process of the image is performed based on stored data corresponding to the selected mode.

37. An computer-readable storage medium which stores a program having computer readable program code units for causing an image formation apparatus capable of being connected to a sheet process device for performing a folding process to a sheet, said storage medium comprising:

original image readout program code unit for reading an original image;

an image formation program code unit for visualizing the original image read by said original image readout means and forming the visualized image on a transfer member; and a postprocess program code unit for performing a postprocess to the transfer member on which the original image has been formed, wherein, in a case where the postprocess is performed to the transfer member by said postprocess program code unit, a nonimage formation area including a processed portion to which the postprocess is performed by said postprocess program code unit and an effective image formation area are set in an image formation area on the transfer member, and the original image read by said original image readout program code unit is formed in the effective image formation area on the transfer member, wherein, in the case where the original image read by said original image readout program code unit is formed on the transfer member, an image part of the original image positioned in the nonimage formation area is deleted, and the original image from which the image part has been deleted is formed in the effective image formation area on the transfer member.

38. A storage medium according to claim 37, wherein it is judged according to a postprocess execution condition of said postprocess program code unit whether or not the nonimage formation area can be set on the transfer member, and it is determined according to the judged result whether or not the nonimage formation area is to be set on the transfer member.

39. A storage medium according to claim 38, further comprising a stapling program code unit for performing a stapling process on the transfer member, and wherein it is judge whether or not the nonimage formation area is to be set on the transfer member, according as a size of the transfer member is a stapling-processable size by said stapling program code unit.

40. A storage medium to claim 38, wherein the judgment is performed by said postprocess program code unit.

41. A storage medium according to claim 37, wherein the nonimage formation area is changeable.

42. A storage medium according to claim 41, wherein the nonimage formation area is changed based on a size of the original and a size of the transfer member.

43. A storage medium according to claim 41, wherein the nonimage formation area is changed based on an instruction from a user.

44. A storage medium according to claim 37, further comprising an image movement program code unit for moving the original image to an arbitrary position, and wherein the original image is moved on the set effective image formation area of the transfer member, by said image movement program code unit.

45. A storage medium according to claim 44, further comprising a movement prohibition setting program code unit for performing setting to prohibit the movement of the original image by said image movement program code unit.

46. A storage medium according to claim 37, further comprising an image reduction program code unit for reducing the original image read by said original image readout program code unit, and wherein the original image is reduced by said image reduction program code unit such that the original image can be held within the set effective image formation area of the transfer member.

* * * * *

UNITED STATES PATENT AND TRADEMARK OFFICE
CERTIFICATE OF CORRECTION

PATENT NO. : 6,097,916
DATED : August 1, 2000
INVENTOR(S) : Hidehiko Asai

It is certified that error appears in the above-identified patent and that said Letters Patent is hereby corrected as shown below:

Column 1,
Line 8, "as" should read -- to as --; and

Column 2,
Line 60, "as" should read -- to as --.

Column 3,
Line 9, "as" should read -- to as --; and
Line 58, "Since the" should read -- The --.

Column 8,
Line 11, "carries" should read -- carry --;
Line 50, "as" should read -- to as --; and
Line 66, "as" should read -- to as --.

Column 9,
Line 37, "margin" should read -- margin --; and
Line 50, "such" should be deleted.

Column 10,
Line 63, "such" should be deleted.

Column 12,
Line 13, "such" should be deleted.

Column 13,
Line 9, "fold)" should read -- folded) --;
Line 39, "such" should be deleted and "as" should read -- to as --.
Line 42, "as" should read -- to as --; and
Line 61, "to" (first occurrence) should be deleted.

Column 15,
Line 53, "claim 1," should read -- claim 11, --.

Column 18,
Lines 31 and 32, "to which the folding process device" should read -- to which the folding process is performed by the sheet process device --.

UNITED STATES PATENT AND TRADEMARK OFFICE
CERTIFICATE OF CORRECTION

PATENT NO. : 6,097,916
DATED : August 1, 2000
INVENTOR(S) : Hidehiko Asai

It is certified that error appears in the above-identified patent and that said Letters Patent is hereby corrected as shown below:

Column 20,
Line 4, "judge" should read -- judged --.

Signed and Sealed this

Twelfth Day of February, 2002

Attest:

Attesting Officer

JAMES E. ROGAN
Director of the United States Patent and Trademark Office